Figure 1:
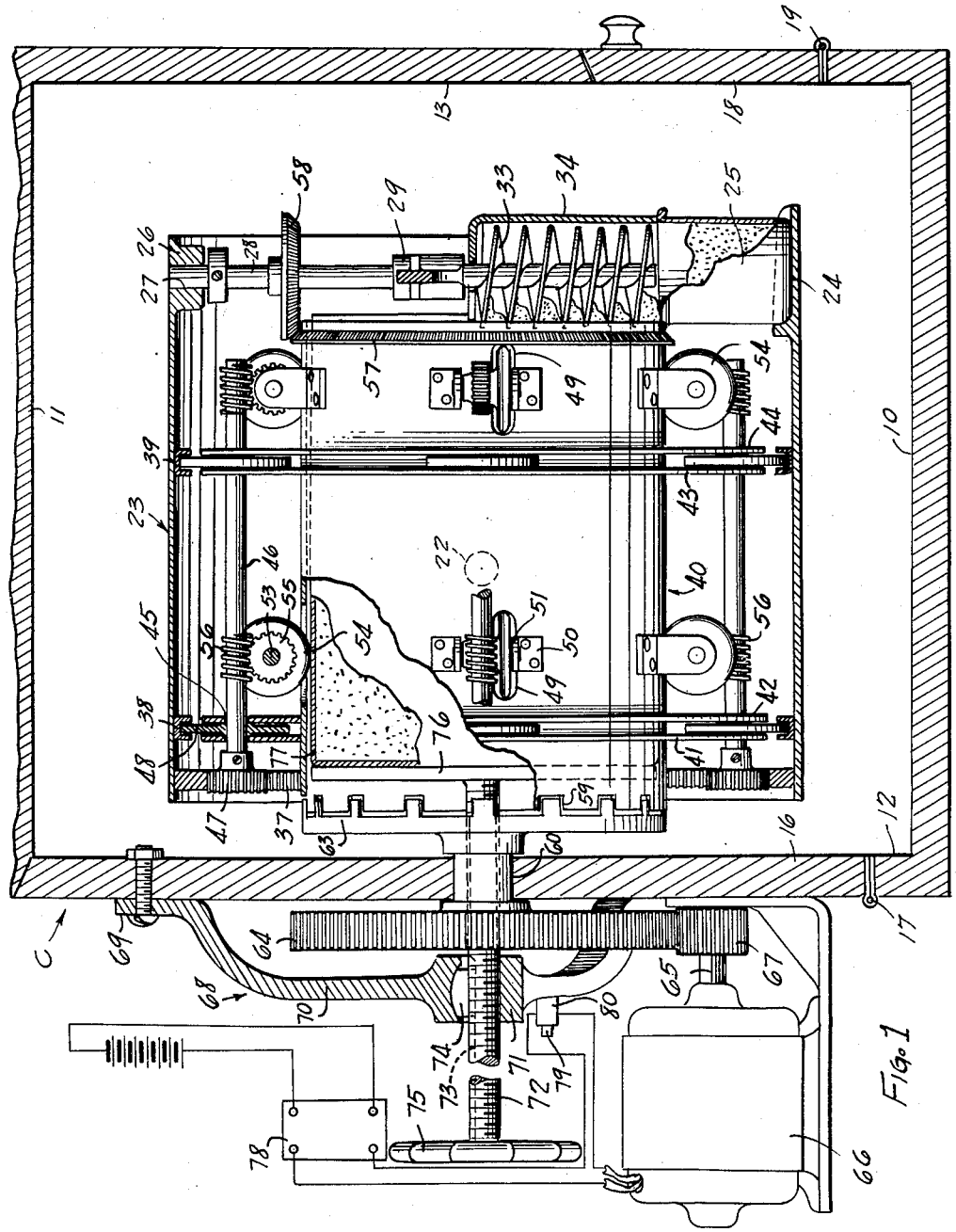

Dec. 21, 1943.   R. M. HESSERT   2,337,161
ICE CREAM DISPENSING AND PACKING DEVICE
Filed Oct. 3, 1941   4 Sheets-Sheet 1

INVENTOR.
RAYMOND M. HESSERT
BY Joshua R. H. Potts
ATTORNEY

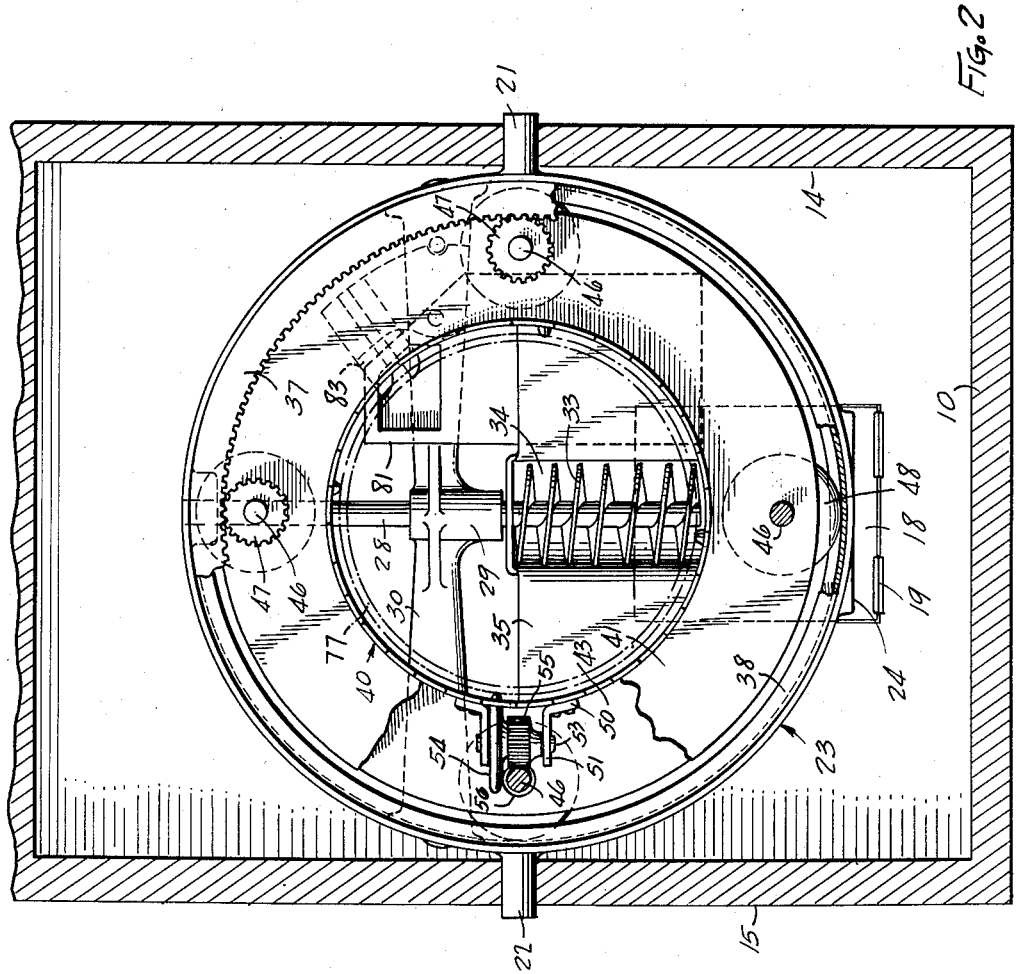

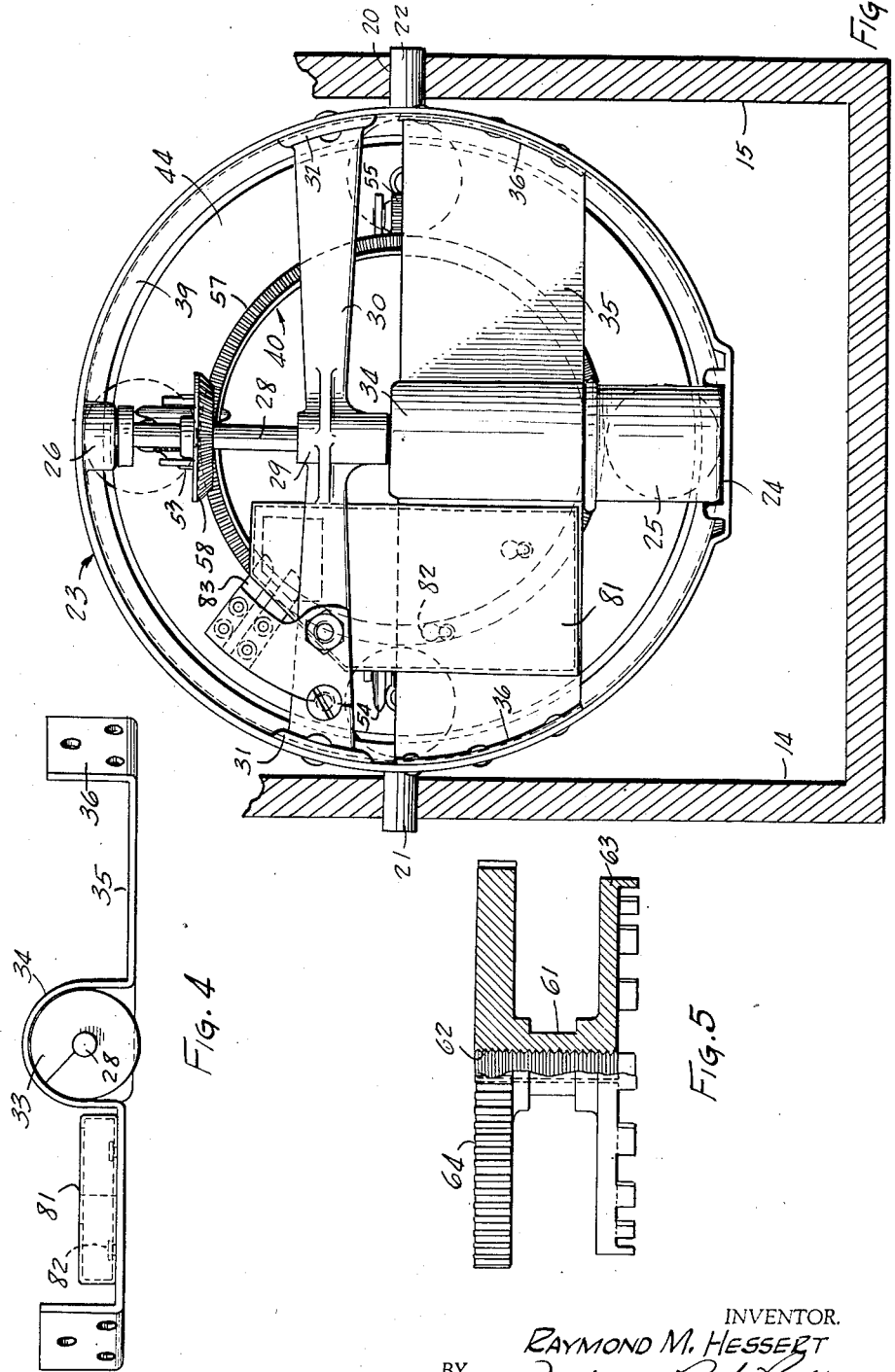

Dec. 21, 1943.   R. M. HESSERT   2,337,161
ICE CREAM DISPENSING AND PACKING DEVICE
Filed Oct. 3, 1941   4 Sheets-Sheet 4

INVENTOR.
RAYMOND M. HESSERT.
BY
ATTORNEY

Patented Dec. 21, 1943

2,337,161

UNITED STATES PATENT OFFICE 2,337,161

ICE CREAM DISPENSING AND PACKING DEVICE

Raymond M. Hessert, Audubon, N. J.

Application October 3, 1941, Serial No. 413,464

12 Claims. (Cl. 226—23)

This invention deals with the retail dispensing of ice cream and is concerned primarily with apparatus designed for the dispensing of ice cream from bulk into the containers of the retail trade.

At the present time the ice cream manufacturer supplies ice cream wholesale or in bulk to the retailer. This bulk ice cream is in multi-gallon lots and the conventional practice is fairly well standardized so that the bulk ice cream is contained in cylindrical containers of standard diameter. Thus, a five gallon container of ice cream is of the same diameter as a three gallon container, the differential being accounted for in the length of the container. Moreover, it is now substantially the universal practice for the manufacturer to employ disposable containers not intended for re-use, the containers being made from paper, cardboard or a similar composition.

Under present day conditions the retailer places the bulk ice cream in a refrigerating cabinet with the opened end of the cylindrical container at the top. The retail dispensing is carried out from this open top, a scoop, ladle or similar instrument being employed to remove the ice cream from the bulk and pack it in the retail container. It is evident that considerable difficulty is experienced by a retailer in carrying out these dispensing and packing operations. Moreover, it is almost impossible to attain a desired degree of uniformity or homogeneity in the packed retail container. Because of this customers are often dissatisfied when air pockets or spaces develop in the packed retail container.

With the foregoing conditions in mind this invention has in view as its foremost objective the provision of apparatus designed to mechanically dispense ice cream from the wholesale container and mechanically pack the dispensed ice cream in a retail container.

More in detail the invention has as an object the provision of apparatus for mechanically dispensing a pre-determined amount of ice cream from bulk and which amount may be varied as occasion demands.

In carrying out these objectives in a practical embodiment the invention proposes the use of apparatus which imparts two distinct movements to the container of the bulk ice cream. In the first instance, provision is made for imparting a rotary motion to the cylindrical container and as the container is so rotated it is advanced rectilineally towards a scooping mechanism which dispenses ice cream from the bulk.

A more particular object of the invention is the provision of novel scooping mechanism designed to cooperate with bulk ice cream having the circular and rectilineal motions above set forth. Following this objective, the scooping mechanism takes the form of a feed screw having a side edge which is adapted to bite into the bulk ice cream as the bulk is fed thereagainst. Means are provided for rotating this feed screw so that ice cream taken thereby from the bulk is delivered to a retail container which may be placed immediately therebeneath.

Another important object of the invention is the provision of control means which is associated with the dispensing apparatus. This control means is designed to insure that the ice cream is delivered from the scooping mechanism in accurately pre-determined amounts.

Yet another object of the invention is the provision of apparatus of the character above noted which is typified by the maintenance of the cylindrical bulk container of ice cream in a substantially horizontal position. A corollary object is the provision of means for tilting the bulk container holding apparatus so that the bulk container assumes a substantially upraised position when occasion demands.

Still another highly important object of the invention is the provision of apparatus of the character above set forth in which means is included for removing the container from the bulk ice cream as the bulk ice cream is brought into engagement with the scooping mechanism. This end is achieved by taking advantage of the rotary motion which is imparted to the container as aforesaid and providing, at appropriate locations, one or more knives for engaging and cutting into the container.

Still another object is the provision of means for collecting the material of the container as it is cut away from the ice cream.

It is evident that it is desirable to stop operation of the apparatus when the bottom of the bulk container reaches the edge of the dispensing screw. Accordingly, a further, more detailed object is the provision of means for indicating when this condition is reached. The apparatus is also designed to make provision for the removal of the bottom of the used container and the insertion of a new container of bulk ice cream.

It is important to note that the use of cylindrical containers for the retail trade is becoming more and more prevalent. In fact, the use of pint and quart cardboard cylindrical containers is now widely prevalent. Apparatus designed in accordance with the above noted objectives is particularly adapted for use with such cylindrical retail containers as the feed screw of the dispensing mechanism may be of a dimension to correspond to the dimension of the retail containers and insure that the ice cream is packed therein in a uniform, homogeneous manner.

Various other objects and advantages of the invention such as arise in connection with carrying out the above noted thoughts in a practical embodiment will in part become apparent and in part be hereinafter stated as the description of the invention proceeds.

The invention, therefore, comprises apparatus designed for the mechanical dispensing of ice cream from bulk and mechanically packing the dispensed ice cream in retail containers. The apparatus consists of mechanism for imparting a rotary motion to a cylindrical bulk container of ice cream and while being so rotated advance the container with a rectilineal motion against dispensing mechanism consisting of a feed screw which bites into the bulk ice cream and which is driven under power. Means are also provided for cutting away the wholesale container and collecting the cut away material.

For a full and more complete understanding of the invention reference may be had to the following description and accompanying drawings, wherein:

Figure 1 is a side view taken as a section through a refrigerator cabinet housing the apparatus of this invention, certain of the parts of the mechanism being broken away and shown in section. This view also develops diagrammatically the electrical circuit of the power means for driving the apparatus.

Figure 6:
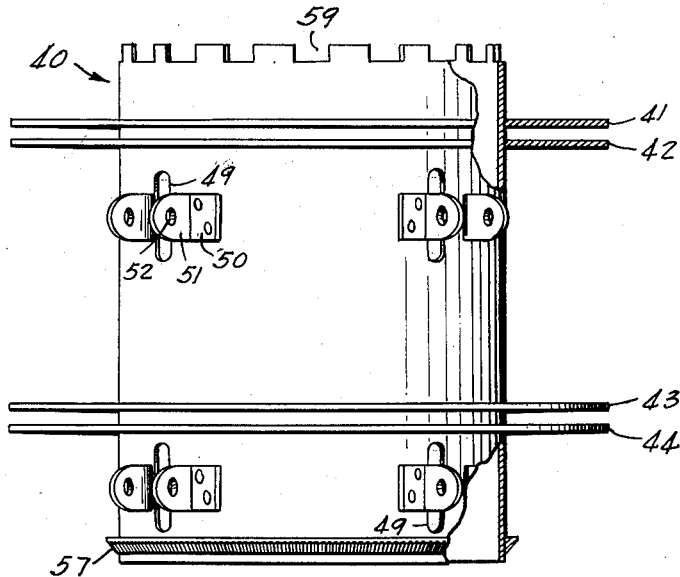
Figure 7:
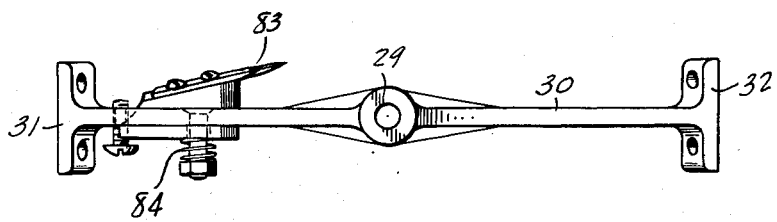

Figure 2 is another section throughout the refrigerator cabinet taken on a plane normal to the showing of Figure 1, Figure 3 is a similar sectional view but looking in the opposite direction from the showing of Figure 2, Figure 4 is an enlarged detail view in plan of the collecting device, Figure 5 is a plan view, partly in elevation and partly in section, of one of the driving parts, Figure 6 is a plan view, with parts broken away and shown in section, of the drum which receives the container of bulk ice cream, and Figure 7 is a plan view of the structure carrying the cutting knives.

Referring now to the drawings wherein like reference characters denote corresponding parts it will be noted that the apparatus of this invention is intended to be enclosed by a refrigerator cabinet that is referred to in its entirety by the reference character C. The interior of the cabinet C is kept at a required temperature by refrigerating apparatus now well-known and available to the public. The cabinet C is defined by a bottom 10, top 11, end walls 12 and 13 and side walls 14 and 15 (see Figures 2 and 3). The end wall 12, for the major part, comprises a swinging panel or door 16 which is hingedly connected at 17 to the remainder of the wall structure 12. This door 16 is open at the times when it becomes necessary to insert a fresh container of bulk ice cream. During ordinary conditions of operation it remains in the closed position depicted in Figure 1.

The end wall 13 is also provided with a comparatively small door at 18. This door 18 is hingedly mounted as shown at 19 and provides access to the scooping apparatus so that retail containers may be inserted and removed as occasion demands.

Each of the side walls 14 and 15 are provided with bearing openings 20, as shown in Figures 2 and 3, and journaled in these openings 20 are trunnions 21 and 22. These trunnions 21 and 22 are carried by a drum 23 and serve to mount this drum 23 so that it may be tilted under certain conditions. It is evident that this drum 23 is held against rotation by its mounting in the refrigerator cabinet C. At the bottom and at the edge adjacent the end wall 13 the drum 23 is flattened out to provide a pocket structure 24 which, it will be noted, is substantially opposite to the door 18. This pocket 24 is intended to receive one of the retail cardboard containers which may be inserted through the door 18, such a container being shown at 25, Figure 1. Substantially diametrically opposite to this pocket structure 24, that is, directly above this pocket, the material of the drum is enlarged to provide a thickened portion or collar 26 that provides a bearing passage 27. A shaft 28 has one end journaled in this bearing passage 27. A second bearing for this shaft 28 is provided by hub structure 29 that is formed on a cross strut 30 (see Figure 7). This cross strut 30 carries at its end feet 31 and 32 which are bolted to the inner side of the drum 23.

The shaft 28 extends downwardly through the hub structure 29 and immediately therebeneath is provided a feed screw 33. This feed screw 33 has a diametrical dimension substantially corresponding to the inner diameter of the container 25. It will be noted from the disclosures of Figures 1, 2, 3 and 4 that the feed screw 33 is partially enclosed by a housing structure designated 34. This housing structure 34 is formed as an integral part of cross piece 35. This cross piece 35 is shown in detail in Figure 4 and is formed at each end with feet 36 that are bolted to the inner side of the drum 23.

At the end remote from the feed screw 33 the drum 23 is provided on its inner cylindrical surface with a ring gear 37, the teeth of which project radically inwardly. The inner cylindrical surface of the drum 23 also carries ring-like tracks 38 and 39 each being of the channel construction depicted in Figure 1.

Referring for the moment more particularly to Figure 6 an inner cylinder is illustrated therein and identified by the reference character 40. This cylinder 40 is intended to loosely receive a cylindrical container of bulk ice cream. Adjacent one end of the cylinder 40 is formed with a pair of ring-like flanges 41 and 42 which, it is noted, are spaced apart, and this flange structure is duplicated at the other end by the flanges 43 and 44. The flanges 41, 42, 43 and 44 are provided with series of aligned openings, such openings being shown at 45 in Figure 1. A shaft 46 extends through each series of aligned openings. In the illustrated embodiment of the invention there are four of these shafts 46 which are spaced around the flanges 41, 42, 43 and 44 at an angular distance of 90°. Each of these shafts 46 driveably carries at one end a pinion 47 and all of the pinions 47 mesh with the internal ring gear 37. Journaled for free rotation on the shafts 46 between the flanges 41 and 42 at one end and the flanges 43 and 44, at the other end are disc-like rollers 48. When the cylinder 40 is assembled within the drum 23 the edges of the rollers 48 are received in the channels of the tracks 38 and 39 and as the cylinder 40 is rotated, as will be later pointed out, these rollers 48 ride around in the tracks 38 and 39.

At a suitably convenient points the cylinder 40 is provided with slots 49. At each side of each slot 49 is a bracket 50 providing an outstanding ear 51 formed with an opening 52. It is evident that there is a pair of these outstanding ears 51 for each slot 49. A shaft 53 has its ends journaled in the openings 52 and extends across the slot 49. A drive roller 54 is non-rotatably mounted on the shaft 53 and a worm gear 55 is similarly carried by this shaft 53. A worm 56 on the shaft 46 meshes with the worm gear 55.

It is evident that as the cylinder 40 rotates the pinions 47 will ride around the ring gear 37. Thus, the shafts 46 are rotated and through worm 56 and worm gear 55 the drive rollers 54 are driven.

At the end adjacent to the wall 13 the drum 40 carries on the exterior cylindrical surface thereof a bevel gear 57 that meshes with a complemental bevel gear 58 that is driveably mounted on the shaft 28. At the other end drum 40 is provided with a series of notches 59 which constitute one element of a clutch, as will be later pointed out.

The door panel 16 is provided with a bearing opening 60 (see Figure 1) and journaled in this bearing opening is a hub member 61, shown in detail in Figure 5. This hub member 61 is provided with a bore extending throughout and this bore is internally threaded as shown at 62. The hub member 61 carries on the end projecting into the interior of the cabinet C a clutch element 63 that is complemental to and cooperates with clutch element 59. These clutch elements 59 and 63 serve to establish a driving relation between the hub 61 and cylinder 40 when the door 16 is in a closed position, as illustrated. On the side of the door exteriorly of the cabinet the hub 61 carries a gear 64. A drive shaft 65, which may be the drive shaft of an electric motor shown at 66, carries a pinion 67 that meshes with the gear 64.

A bracket member 68 has feet 69 that are anchored to the door 16 and a central portion 70 that is spaced from the door 16. This central portion 70 is provided with a hub structure at 71. A screw member 72 extends through the hub structure 71 and is threaded through the bore 62 of the hub member 61. This screw member 72 is formed with a keyway 73 which receives one end of a removable key 74. It will be noted that this key 74 extends through a passage in the hub structure 71 and serves to hold the screw member 72 against rotation. The outer end of the screw member 72 is provided with a hand wheel at 75 which may be availed of to rotate the screw member 72 when the key 74 is removed.

The screw member 72 extends through the internally threaded bore 62 and past the clutch member 63 into the interior of the cabinet where it carries at its inner extremity a push plate 76. A container of bulk ice cream is represented at 77 and is shown as being received within the cylinder 40 with its bottom resting against the push plate 76.

The electrical circuit of the motor 66 includes diagrammatically at 78, a well known adjustable time limit switch for controlling the motor 66 to control the length of time during which the motor will run and dispense ice cream at any one setting. The spring held button 79 of a switch 80, mounted on bracket 68, will be depressed by hand wheel 75 to break the circuit to the motor when the ice cream container has been pushed forwardly to the point where no more ice cream is available for feed screw 33.

It is evident that rotation of the gear 64 will cause an inner feeding of the screw member 72, thus, the push plate 76 engages the container 77 and forces the ice cream container thereof against feed screw 33. The container 77 is made of a disposable material either paper, cardboard or a suitable composition. Knives 83 are shown as carried by the cross strut 30 and these knives are spring backed as depicted at 84. The points of the knives 83 engage a container 77 and serve to cut the same away as the container is rotated. The cut away material of the container may fall into an open topped receptacle 81 that is removably mounted on the cross piece 35, a well known type of pin and slot connection being employed for the removable mounting. This type of connection is shown at 82 in Figure 3.

The operation of the above described apparatus is outlined as follows:

The door 16 is first opened to remove the push plate 76 from the cylinder 40. The cylinder is now open for the insertion of a container of cylindrical bulk ice cream. One of these containers 77 is then inserted after which the door 16 is closed. This brings the push plate 76 into engagement with the bottom of the container 77 and at the same time the clutch element 63 is brought to mesh with the clutch notches 59. The motor 66 is now started. Through pinion 67 and gear 64 the hub 61 is rotated and by this rotary motion two distinct movements are imparted to the container 77. In the first place, the clutch elements 59 and 63 serve to rotate the cylinder 40 and the container 77 is correspondingly rotated. At the same time the internally threaded bore 62 engages the screw member 72 which is held against rotation by the key member 74 to advance the push plate 76 rectilineally, this rectilineal motion of the ice cream container is aided by the drive rollers 54 which, it is to be remembered, are driven as an incident to the rotation of the cylinder 40.

Prior to starting the motor 66 one of the retail containers 25 will be inserted through the door 18 into position in the pocket structure 24 beneath the feed screw 33. As the cylinder 40 rotates the gears 57 and 58 drive the shaft 28 to rotate the feed screw 33. As the bulk ice cream is pushed against one edge of the feed screw 33 by the rectilineal motion, feed screw 33 cuts the ice cream from the bulk and feeds the same downwardly to the container 25. When the apparatus is operated for an accurately pre-determined period of time the container 25 will be filled whereupon the time limit switch 78 cuts off the motor and stops the operation. The container 25 will be uniformly packed by the feed screw 33 and may be removed through the opening 18 and replaced by an unfilled retail container. It is evident that as the container 77 is moved toward the feed screw 33 it is cut away by the knives 83 and the material of the container so cut away is received in the receptacle 81. This receptacle may be removed from time to time to dispose of the contents thereof.

It is evident that under ordinary conditions of usage the container 77 of the bulk ice cream is in a horizontal position. However, if long periods of non-use are to be encountered the door 16 may be opened whereupon the drum 23 may be tilted into an upraised position on the trunnions 21 and 22, thus, any dripping of the ice cream may be prevented.

While a preferred specific embodiment of the invention is hereinbefore set forth, it is to be clearly understood that the invention is not to be limited to the exact construction illustrated and described, because various modifications of these details may be provided in putting the invention into practice, within the purview of the appended claims.

I claim:

1. Ice cream dispensing and packing apparatus comprising means for imparting motion to a container of bulk ice cream, and mechanism cooperating with said motion to remove ice cream from the bulk, said mechanism including a feed screw which first cuts ice cream from the bulk and then packs the removed ice cream in a retail container.

2. Apparatus of the character described comprising a refrigerator cabinet, a drum held against rotation within said refrigerator cabinet, a cylinder rotatable in said drum and adapted to receive a container of bulk ice cream, means for rotating said cylinder, planetary gear means on said drum and cylinder for imparting a rectilineal movement to said bulk ice cream container in said cylinder, a feed screw having an edge engaging said bulk ice cream, and means for driving said feed screw.

3. Apparatus of the character described comprising a refrigerator cabinet, a drum held against rotation within said cabinet, a dispensing mechanism mounted on said drum, means carried by said drum for supporting a retail container beneath said dispensing mechanism, a cylinder rotatable within said drum and adapted to receive a container of bulk ice cream, means for rotating said cylinder, and planetary gear means on said drum and cylinder for moving said bulk ice cream against said dispensing mechanism.

4. Apparatus of the character described comprising a refrigerator cabinet having a movable door, a hub member journaled in said movable door, a power source for driving said hub member, a drum within said cabinet, a cylinder rotatably mounted in said drum for supporting a retail container of bulk ice cream, cooperating clutch members on said hub member and said cylinder which when engaged rotate said cylinder from said hub member, dispensing mechanism carried by said drum, and means actuated by rotation of said hub member for causing movement of said bulk ice cream in said cylinder against said dispensing mechanism.

5. Apparatus of the character described comprising a refrigerator cabinet having a movable door, a hub member journaled in said movable door, a power source for driving said hub member, a drum within said cabinet, a cylinder rotatably mounted in said drum, cooperating clutch members on said hub member and said cylinder which when engaged rotate said cylinder from said hub member, dispensing mechanism carried by said drum, said cylinder being adapted to receive a container of bulk ice cream, said hub member being provided with a threaded bore, a screw stem in said bore, means for holding said screw stem against rotation, and a push plate carried by said screw stem and adapted to engage the bottom of a container of bulk ice cream in said cylinder to urge the same against said dispensing mechanism.

6. Ice cream dispensing apparatus comprising means for imparting rotary motion to a cylindrical container of bulk ice cream, mechanism cooperating with said rotary motion to remove ice cream from the bulk, and an automatic time control for said means whereby said motion of said bulk ice cream is continued for a predetermined period of time to dispense a desired measured quantity of ice cream from the bulk.

7. Ice cream dispensing apparatus comprising means for imparting rotary motion to a cylindrical container of bulk ice cream, mechanism presenting an instrumentality for biting into said bulk ice cream as it is rotated, means for causing relative movement of said bulk ice cream and said mechanism towards one another, and an automatic time control for both said means.

8. Apparatus of the character described comprising a drum, a cylinder rotatable in said drum and adapted to receive a container of bulk ice cream, said container of bulk ice cream being rotatable with said cylinder, dispensing mechanism carried by said drum engaging said bulk ice cream, means for imparting a rectilineal movement to said bulk ice cream whereby said bulk ice cream is urged against said dispensing mechanism, and auxiliary mechanism including differential gears on said drum and cylinder, respectively, for aiding said rectilineal motion of said container of bulk ice cream.

9. Ice cream dispensing and packing apparatus comprising means for imparting rotary motion to a container of ice cream in bulk, a feed screw having an edge engaging said bulk ice cream, means for driving said feed screw, means for causing relative movement of said feed screw and said bulk ice cream towards one another, and cutting elements fixedly held with respect to said container and engaging said container to cut the same away as an incident to said rotary motion.

10. Apparatus of the character described comprising a drum, a feed screw carried by said drum, a cylinder rotatable in said drum and adapted to receive a cylindrical container of bulk ice cream, driving connections between said cylinder and said feed screw, means for rotating said cylinder, means for imparting a rectilineal movement to a container of bulk ice cream in said cylinder to urge the ice cream against said feed screw, and auxiliary mechanism including differential gears on said drum and cylinder for aiding said rectilineal movement.

11. Apparatus of the character described comprising a refrigerator cabinet, a drum tiltably mounted in said cabinet, means for normally maintaining said drum in a horizontal position, a cylinder rotatable in said drum and adapted to receive a container of bulk ice cream, dispensing mechanism carried by said drum and engaging said bulk ice cream, means for rotating said cylinder, and means for imparting rectilineal motion to a container of bulk ice cream in said cylinder to urge the same against said dispensing mechanism.

12. Ice cream dispensing apparatus comprising means for imparting motion to a cylindrical container of bulk ice cream, dispensing mechanism presenting an instrumentality for biting into said bulk ice cream, means for causing relative movement of said bulk ice cream and said dispensing mechanism toward each other, and automatic means for stopping said means and mechanism after a desired quantity of ice cream has been dispensed.

RAYMOND M. HESSERT.